United States Patent
Kutsuna

(10) Patent No.: US 7,322,237 B2
(45) Date of Patent: Jan. 29, 2008

(54) GYRO SENSOR OF AN ELECTROSTATIC DRIVING AND CAPACITANCE DETECTING TYPE

(75) Inventor: Yuji Kutsuna, Oobu (JP)

(73) Assignee: Denso Corporation, Kariya (JP)

( * ) Notice: Subject to any disclaimer, the term of this patent is extended or adjusted under 35 U.S.C. 154(b) by 66 days.

(21) Appl. No.: 11/438,301

(22) Filed: May 23, 2006

(65) Prior Publication Data
US 2006/0277995 A1  Dec. 14, 2006

(30) Foreign Application Priority Data
Jun. 14, 2005  (JP)  ............................. 2005-173710

(51) Int. Cl.
*G01P 9/04* (2006.01)
(52) U.S. Cl. .................................. 73/504.12
(58) Field of Classification Search ............. 73/504.12, 73/504.14, 504.16
See application file for complete search history.

(56) References Cited

U.S. PATENT DOCUMENTS 5,794,080 A * 8/1998 Watanabe et al. ......... 73/504.12
6,220,094 B1 * 4/2001 Ichinose et al. .......... 73/504.16
6,412,347 B1 * 7/2002 Kuroda et al. ........... 73/504.16
6,497,147 B2 * 12/2002 Kato et al. ............... 73/504.12
2005/0274141 A1  12/2005 Kutsuna et al.

FOREIGN PATENT DOCUMENTS

| JP | 62-052410 | 3/1987 |
| JP | 2005-351820 | 12/2005 |

* cited by examiner

*Primary Examiner*—John E. Chapman
(74) *Attorney, Agent, or Firm*—Posz Law Group, PLC

(57) ABSTRACT

A gyro sensor having a vibrator and a start circuit generates an oscillation encouraging signal by boosting a first voltage to a voltage of the signal in response to a start signal of a start frequency sent from the start circuit. The vibrator is vibrated in response to the oscillation encouraging signal. When the vibrator is self-excited, the vibrator outputs a first detecting signal indicating an oscillating amplitude and oscillating frequency in the vibration of the vibrator. The sensor boosts the first voltage to a second voltage in response to the first detecting signal and generates a driving signal of a driving frequency and the second voltage. The self-excitation of the vibrator is continued in response to the driving signal. The vibrator outputs a second detecting signal indicating a yaw added to the vibrator. The sensor generates a sensor signal corresponding to the yaw from the second detecting signal.

12 Claims, 3 Drawing Sheets

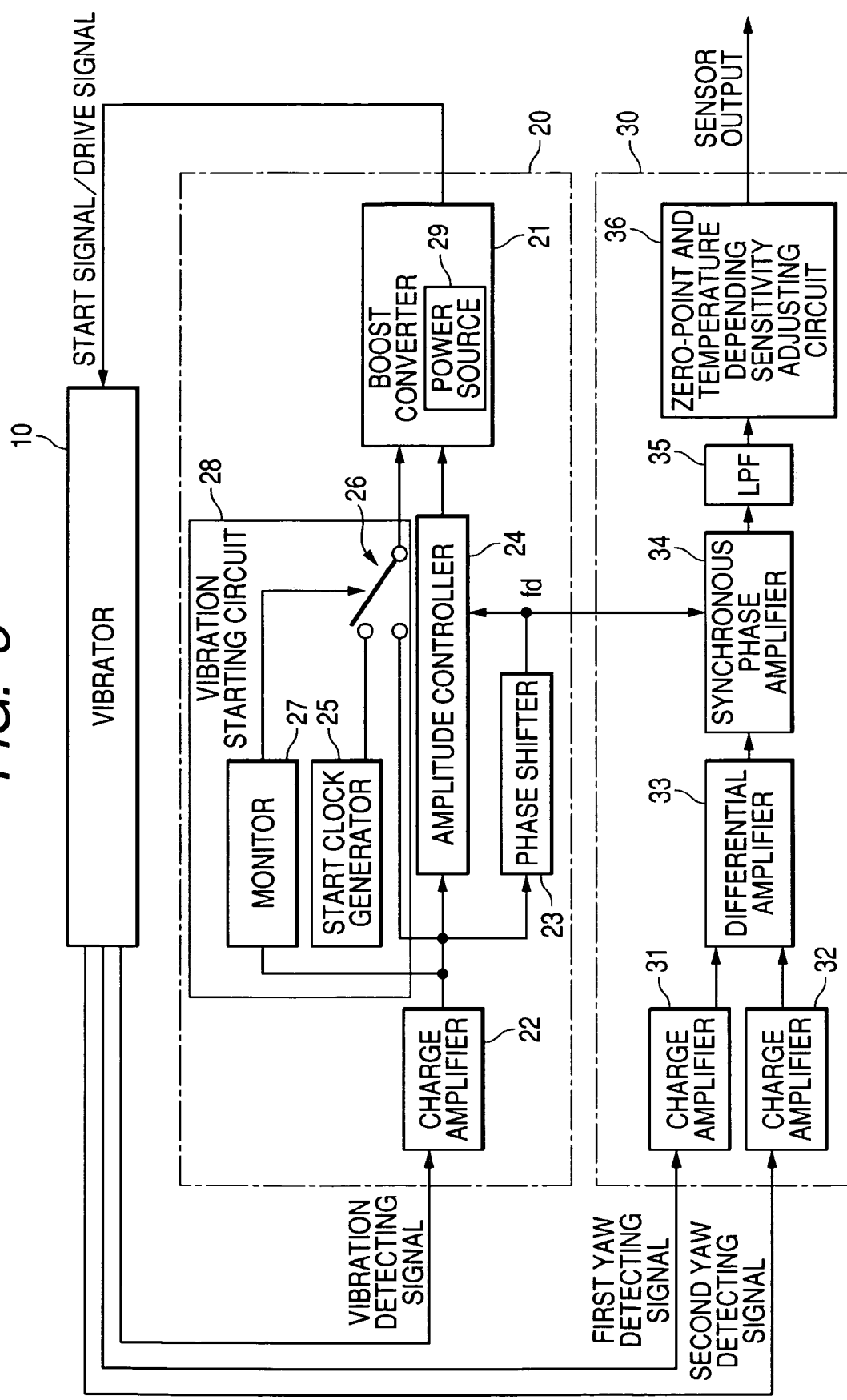

GYRO SENSOR OF AN ELECTROSTATIC DRIVING AND CAPACITANCE DETECTING TYPE

CROSS-REFERENCE TO RELATED APPLICATION

This application is based upon and claims the benefit of priority of the prior Japanese Patent Application 2005-173710 filed on Jun. 14, 2005 so that the contents of which are incorporated herein by reference.

BACKGROUND OF THE INVENTION

1. Field of the Invention

The present invention relates to a gyro sensor (or yaw rate sensor) wherein a physical quantity such as a yaw added to the sensor is detected based on a detecting signal transmitted from a vibrator when the vibrator is vibrated in self-excitation in response to a driving signal transmitted from the vibrator.

2. Description of Related Art

A conventional gyro sensor is, for example, installed in a vehicle to detect a yaw rate indicating an angular velocity of the vehicle. In this sensor, a feedback loop is formed by a vibrator and a driving circuit to self-excite the vibrator at its natural frequency, and a rate of yaw added to the vibrator is detected in a yaw detecting circuit. As a type of gyro sensor, a micro gyro sensor of an electrostatic driving and capacitance detecting type has been disclosed in Published Japanese Patent Second Publication No. 2084567.

In a vibrator of this micro sensor, a fixed driving element adjacent to a movable element via a space is disposed as a driving sensor element, and a pair of fixed detecting elements adjacent to the movable element via a space are disposed as a pair of detecting sensor elements on both right and left sides of the vibrator. When a driving signal transmitted from a driving circuit of the sensor is added to the driving element, the movable element is vibrated in self-excitation along a driving direction. When a yaw is added to the sensor, the movable element is further vibrated along a detecting direction perpendicular to the driving direction, and a capacitance between each detecting element and the movable element is oscillated. Each detecting element outputs a detecting signal indicating the oscillating capacitance. In a yaw detecting circuit of the sensor, each detecting signal is changed to a voltage signal in a charge amplifier. A differential output is obtained from the voltage signals in a differential amplifier. This output passes through a synchronous phase detecting circuit, a low pass filter and a zero-point and temperature depending sensitivity adjusting circuit, and a sensor output indicating a rate of the raw is finally outputted.

In this micro sensor, the driving signal is obtained from a vibration detecting signal outputted from the driving element while using a power source normally set at 5 voltages and disposed outside the sensor. However, even though the driving signal set at 5V is supplied to the vibrator to continue self-excitation of the vibrator, the vibrator is not continuously self-excited in response to the driving signal of 5V. Therefore, a sensor output correctly indicating a yaw rate cannot be sufficiently obtained. To reliably continue the self-excitation of the vibrator, it is required to boost a voltage of the driving signal to a high voltage not less than 5V.

Further, in a conventional gyro sensor other than the micro gyro sensor, when the supply of electric power to the sensor is started, self-excitation of the vibrator is started in response to noises generated in a power source of 5V. In contrast, in the micro sensor, self-excitation of the vibrator cannot be started in response to noises generated in a power source of 5V. Therefore, to reliably start self-excitation of the vibrator in the micro sensor, it is required to boost 5V of a signal obtained from the power source to a high voltage and to apply a signal of the high voltage to the vibrator.

Especially, in the micro sensor, self-excitation of the vibrator is continued at its natural frequency in response to a driving signal when a frequency of the driving signal matches with the natural frequency, and a clock signal outputted from the self-excited vibrator is also used as a boosting clock signal required to generate the driving signal of a high voltage by boosting 5V of a signal obtained from a power source to the high voltage. Therefore, the driving signal of the high voltage cannot be obtained until the self-excitation of the vibrator starts is started to generate the clock signal in a feedback loop of a sensor circuit, and the self-excitation of the vibrator cannot be rapidly started unless the driving signal of the high voltage is not rapidly obtained.

SUMMARY OF THE INVENTION

An object of the present invention is to provide, with due consideration to the drawbacks of the conventional gyro sensor, a gyro sensor wherein self-excitation of a vibrator to be vibrated in response to a driving signal of a high voltage is rapidly started to rapidly generate the driving signal of the high voltage from a clock signal obtained from the self-excited vibrator and set at a predetermined voltage lower than the high voltage.

According to an aspect of this invention, the object is achieved by the provision of a gyro sensor having a vibrator, a driving circuit and a yaw detecting circuit. The vibrator is possible to be vibrated in self-excitation, outputs a first detecting signal indicating an oscillating amplitude and an oscillating frequency in the vibration of the vibrator when the vibrator is set in a condition of self-excitation, and outputs a second detecting signal indicating a yaw added to the vibrator. The driving circuit generates a first voltage, generates a control signal from the first detecting signal outputted from the vibrator, boosts the first voltage to a second voltage in response to the control signal to generate a driving signal set at both the second voltage and a driving frequency from the control signal, and transmits the driving signal to the vibrator to continue self-excitation of the vibrator in response to the driving signal. The yaw detecting circuit generates a sensor signal corresponding to the yaw from the second detecting signal of the self-excited vibrator and outputs the sensor signal.

The sensor further has a starting circuit which supplies a start signal of a start frequency to the driving circuit and causes the driving circuit to generate an oscillation encouraging signal in response to the start signal by boosting the first voltage to a voltage of the oscillation encouraging signal such that the self-excitation of the vibrator is started in response to the oscillation encouraging signal.

In this configuration, when the vibrator is not yet self-excited, the starting circuit supplies a start signal of a start frequency to the driving circuit as a boosting clock signal. The driving circuit boosts the first voltage according to the start signal to generate an oscillation encouraging signal having a boosted voltage. The vibration of the vibrator is started in response to the oscillation encouraging signal. When the vibrator is stably vibrated, the self-excitation of the vibrator is started. Then, the self-excited vibrator outputs a first detecting signal to the driving circuit and outputs a second detecting signal to the yaw detecting circuit. The driving circuit generates a control signal from the first detecting signal and generates a driving signal set at both a second voltage and a driving frequency from the control signal by boosting the first voltage to the second voltage according to the control signal. Therefore, self-excitation of the vibrator is continued in response to the driving signal. The yaw detecting circuit generates a sensor signal corresponding to a yaw added to the sensor from the second detecting signal and outputs the sensor signal.

Accordingly, because the starting circuit provides the start signal for the driving circuit as a boosting clock signal to generate the oscillation encouraging signal in the driving circuit, the self-excitation of the vibrator can be reliably and rapidly started in response to the oscillation encouraging signal of a boosted voltage.

BRIEF DESCRIPTION OF THE DRAWINGS

FIG. 3 is a block diagram of a gyro sensor according to a second embodiment of the present invention.

DETAILED DESCRIPTION OF THE PREFERRED EMBODIMENTS

Figure 1:
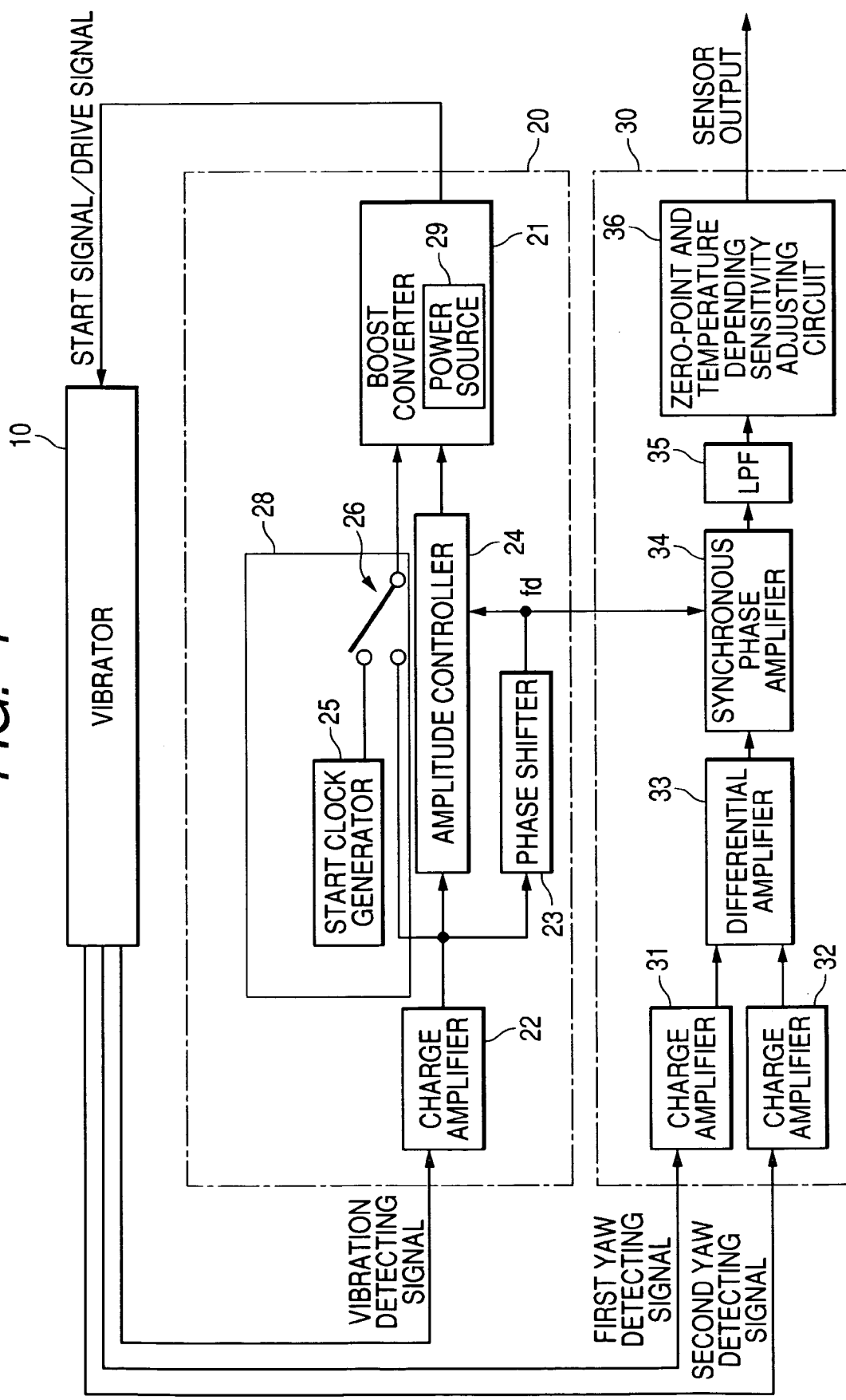
FIG. 1 is a block diagram of a gyro sensor according to a first embodiment of the present invention.

Embodiments of the present invention will now be described with reference to the accompanying drawings, in which like reference numerals indicate like parts, members or elements throughout the specification unless otherwise indicated.

Embodiment 1

A gyro sensor of an electrostatic driving and capacitance detecting type is shown in FIG. 1 according to a first embodiment.

As shown in FIG. 1, a gyro sensor (or yaw rate sensor) disposed on a vehicle has a vibrator 10, a driving circuit 20, and a yaw detecting circuit 30. The vibrator 10 has a driving sensor element (not shown) and a pair of yaw detecting sensor elements (not shown). On condition that the driving sensor element is vibrated, the vibrator 10 outputs a vibration detecting signal to the circuit 20. When a yaw is added to the vibrator 10 during the vibration of the driving sensor element, the yaw detecting sensor elements are vibrated due to Corioli's force, and the yaw detecting sensor elements of the vibrator 10 output first and second yaw detecting signals to the circuit 30, respectively.

The circuit 20 generates a predetermined voltage, generates a control signal from the first detecting signal outputted from the vibrator 10, boosts the predetermined voltage to a high voltage in response to the control signal to generate a driving signal set at both the high voltage and a driving frequency fd from the control signal, and transmits the driving signal to the vibrator 10 to continue self-excitation of the vibrator 10 in response to the driving signal. More specifically, the circuit 20 has a charge amplifier 22, a phase shifter 23, an amplitude controller 24, and a boost converter 21 including a power source 29 of 5V. The amplifier 22 receives a vibration detecting signal from the vibrator 10 set in a condition of self-excitation. This signal indicates an oscillating capacitance and oscillating frequency in the vibration of the vibrator 10. The amplifier 22 converts the capacitance to an oscillating voltage and amplifies the oscillating voltage. The converter 21 boosts a voltage of a predetermined signal generated in the power source 29 in response to the vibration detecting signal sent from the amplifier 22 and generates a driving signal having a high voltage.

The phase shifter 23 generates a phase correcting signal from the vibration detecting signal to adjust a phase of the driving signal. A phase of the vibration detecting signal used for the generation of the driving signal differs from that of an idealistic driving signal desired to stably vibrate the driving sensor element. Therefore, assuming that a driving signal having the same phase as that of the vibration detecting signal is transmitted to the vibrator 10, the driving sensor element cannot be stably vibrated. To prevent this problem, the converter 21 adjusts the phase of the driving signal according to the phase correcting signal, and the driving signal has a driving frequency fd required to vibrate the driving sensor element at the predetermined frequency.

The controller 24 generates an amplitude control signal from the vibration detecting signal to maintain the amplitude of the driving signal at a constant value. The converter 21 adjusts the amplitude of the driving signal according to the amplitude control signal.

Because a feedback loop is formed by the amplifier 22, the phase shifter 23 and the controller 24 in addition to the vibrator 10 and the converter 21, the converter 21 can generate the driving signal from the vibration detecting signal which indicates the vibration of the driving sensor element vibrated in response to the driving signal. Further, because the converter 21 generates the driving signal based on control signals (vibration detecting signal, phase correcting signal and amplitude control signal), the driving sensor element can continue vibrating at the predetermined amplitude and its natural frequency in response to the driving signal.

The sensor further has a vibration starting circuit 28. When the sensor is not operated, the vibrator 10 is not vibrated. When an operation of the sensor is started, the circuit 28 inputs a start signal of a start frequency to the driving circuit 20 and causes the driving circuit 10 to generate an oscillation encouraging signal from the start signal by boosting a voltage of the start signal to a voltage of the oscillation encouraging signal. The self-excitation of the vibrator is started in response to the oscillation encouraging signal. More specifically, the circuit 28 has both a starting clock generator 25 such as a CR oscillator and a change-over switch 26 acting as a selector. The generator 25 is oscillated in response to a low voltage at a predetermined clock frequency, so that the generator 25 stably generates a start clock signal at the predetermined clock frequency. The predetermined clock frequency is equal to or higher than the oscillating frequency (or natural frequency) of the vibrator 10 self-excited. To rapidly start the self-excitation of the vibrator 10, the predetermined clock frequency is preferably set to be higher than the oscillating frequency. The low voltage is lower than 5V of the power source 29. To save electric power in the generator 25, the low voltage is preferably set to be lower than 4V. The switch 26 selects either a signal outputted from the amplifier 22 or the start clock signal of the generator 25 and outputs the selected signal to the converter 21 as a boosting clock signal. The switch 26 automatically selects the signal of the generator 25 until a predetermined period of time passes after the operation of the sensor is started. Then, when the predetermined period of time has passed, the switch 26 automatically changes the selection to the signal of the amplifier 22.

The predetermined period of time is defined by a period of time required to start the self-excitation of the vibrator 10 based on the start clock signal of the generator 25. For example, the predetermined period of time is equivalent to a period of time from a start time of the boosting in the converter 21 in response to the start clock signal to a start time of the self-excitation of the vibrator 10 based on a signal of a boosted voltage. This predetermined period of time is determined by actually measuring a period of time from the boosting time to the starting time in this sensor.

The circuit 30 generates a sensor output from the first and second yaw detecting signals outputted from the vibrator 10. The sensor output indicates a rate of yaw added to the vibrator 10. More specifically, the circuit 30 has a pair of charge amplifiers 31 and 32, a differential amplifier 33, a synchronous phase detector 34, a low pass filter (LPF) 35, and a zero-point and temperature depending sensitivity adjusting circuit 36.

Each of the amplifiers 31 and 32 receives the yaw detecting signal from the vibrator 10 and converts an oscillating capacitance of the signal into an oscillating voltage. The amplifier 33 generates a differential output indicating a difference between the voltages of the yaw detecting signals. The circuit 34 extracts from the differential output components synchronizing with a signal of the frequency fd generated in the phase shifter 23. Components of the predetermined frequency or less among the extracted components pass through the LPF 35. Because the components passing through the LPF 35 have an output offset and depend on a temperature-depending sensitivity, the components are adjusted in the adjusting circuit 36. The sensor output is outputted from the circuit 36.

Next, an operation of the sensor is described.

When a battery (not shown) starts supplying electric power to the circuits 20 and 30 in response to the turning-on of an ignition switch (not shown), an operation of the sensor is started. At this time, because the vibrator 10 has not yet been vibrated, the amplifier 22 outputs no signal. To start self-excitation of the vibrator 10, the generator 25 automatically generates a start clock signal of a predetermined clock frequency and transmits the signal to the converter 21 through the switch 26 as a boosting clock signal. The converter 21 boosts a voltage (e.g., 5V) of the power source 29 to the high voltage in response to the clock signal to generate an oscillation encouraging signal of the constant high voltage. The vibrator 10 starts vibrating in response to the oscillation encouraging signal. Because the clock signal generated in the generator 25 has the predetermined clock frequency higher than the oscillating frequency of the vibrator 10, the oscillation encouraging signal in the converter 21 can be rapidly generated as compared with a driving signal generated from a signal of the oscillating frequency. Because the converter 21 rapidly generates the oscillation encouraging signal, the vibrator 10 can rapidly start vibrating in response to this signal. As the frequency of the clock signal is heightened, a period of time required to start the vibration of the vibrator 10 based on the start clock signal is shortened.

Thereafter, when the predetermined period of time has passed after the boosting in the converter 21 based on the start clock signal of the generator 25, the vibrator 10 is stably vibrated, and self-excitation of the vibrator 10 is started. Because the vibrator 10 rapidly starts vibrating, the self-excitation of the vibrator 10 can be rapidly started. After the self-excitation of the vibrator 10, the vibrator 10 stably generates the vibration detecting signal correctly indicating the oscillating frequency and oscillating capacitance in the vibration of the vibrator 10. The amplifier 22 converts the oscillating capacitance of this signal to an oscillating voltage. Further, when the predetermined period of time has passed, the switch 26 changes the selection to a signal of the amplifier 22. Therefore, the amplifier 22 sends the signal indicating the oscillating voltage to the converter 21, the shifter 23 and the controller 24. The converter 21 boosts a voltage applied by the power source 29 to a high voltage in response to the detecting signal to generate a driving signal of the high voltage and corrects a phase of the driving signal according to signals outputted from the shifter 23 and the controller 24 to be set at a driving frequency fd. Because the vibration detecting signal generated based on the driving signal is fed back from the vibrator 10 to the converter 21, the driving signal can be correctly adjusted in the converter 21 by the shifter 23 and the controller 24 such that the driving signal is set at the high voltage and driving frequency fd. Therefore, self-excitation of the vibrator 10 is reliably continued in response to the driving signal.

In this case, it is preferred that the CR oscillation in the generator 25 be stopped when the predetermined period of time has passed. In this case, the generation of noises caused by the clock signal in the generator 25 can be minimized, and the vibrator 10 can be stably vibrated.

In the yaw detecting circuit 30, first and second yaw detecting signals received in the amplifiers 31 and 32 are processed in the amplifier 30, the detector 34, the LPF 35, and the adjusting circuit 36. Then, a sensor output is outputted from the circuit 30. When a yaw is added to the sensor, the sensor output indicates a rate of the added yaw.

As described above, in this embodiment, when an operation of the sensor is started to self-excite the vibrator 10, a clock signal of the generator 25 is automatically inputted to the converter 21 via the switch 26 until the predetermined period of time passes, that is, the self-excitation of the vibrator 10 is started. When the self-excitation of the vibrator 10 is started, the vibration detecting signal generated based on the self-excitation of the vibrator 10 is automatically inputted to the converter 21 via the switch 26. Accordingly, a driving signal of a high voltage can be rapidly generated by rapidly boosting a voltage to the high voltage in response to the clock signal of the generator 25, and the self-excitation of the vibrator 10 caused by the driving signal can be rapidly started. Further, a rate of yaw added to the sensor can be rapidly detected according to yaw detecting signals generated based on the self-excitation of the vibrator 10.

Figure 2:
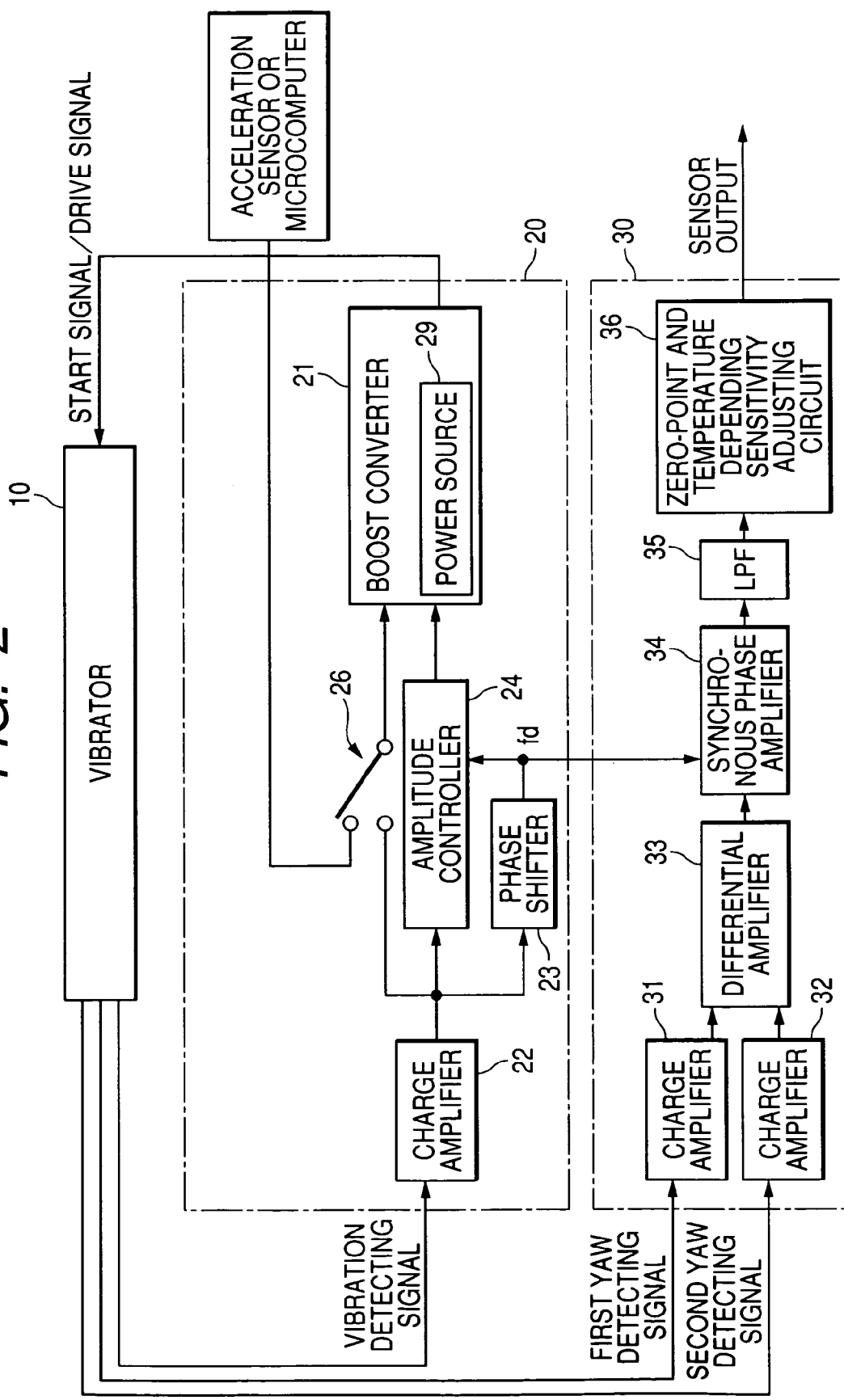
FIG. 2 is a block diagram of a gyro sensor according to a modification of the first embodiment.

In this embodiment, the clock generator 25 is disposed in the driving circuit 20. However, the generator 25 may be disposed outside the driving circuit 20 or the sensor. Further, it is not required to additionally dispose the generator 25 in the sensor. For example, when the sensor is used as an inertia sensor on a vehicle, as shown in FIG. 2, an acceleration sensor or a microcomputer disposed on a vehicle can be applied as a start clock generator in place of the generator 25. In this case, an area occupied by the sensor can be reduced, and the manufacturing cost of the sensor can be reduced.

Further, this embodiment is not limited to the vibration starting circuit 28 having the switch 26. For example, an output signal line of the amplifier 22 may be always directly connected with an input terminal of the converter 21 without using any switch. In this case, when the vibrator 10 is not self-excited, no signal of the amplifier 22 is substantially transmitted to the converter 21 directly connected with the amplifier 22. Further, an output signal line of the generator 25 maybe always directly connected with an input terminal of the converter 21 without using any switch. In this case, when the vibrator 10 is self-excited, generation of a clock signal is stopped in the generator 25. Therefore, no influence of the generator 25 is substantially exerted on the converter 21 directly connected with the generator 25 during the self-excitation of the vibrator 10.

Embodiment 2

FIG. 3 is a block diagram of a gyro sensor according to a second embodiment of the present invention.

The sensor shown in FIG. 3 differs from that shown in FIG. 1 in that the sensor additionally has a monitor 27 in the vibration starting circuit 28. The monitor 27 detects or judges whether or not the self-excitation of the vibrator 10 is started. When the self-excitation of the vibrator 10 is started, the monitor 27 controls the switch 26 to change over from the connection of the converter 21 with the generator 25 to the connection of the converter 21 with the amplifier 22.

More specifically, the monitor 27 has a comparator for comparing a reference voltage Vref with a voltage of a vibration detecting signal outputted from the amplifier 22. The reference voltage Vref is preset such that the voltage of the detecting signal stably vibrated exceeds the voltage Vref. Therefore, when the self-excitation of the vibrator 10 is started, the voltage of the detecting signal exceeds the voltage Vref. More specifically, after the vibration of the vibrator 10 is started, an oscillating amplitude of the vibrator 10 is increased. When the oscillating amplitude of the vibrator 10 reaches substantially a stable value, the self-excitation of the vibrator 10 is started. A transitional voltage of the detecting signal corresponding to the oscillating amplitude of the vibrator 10 not yet self-excited is assumed or measured, and a stable voltage of the detecting signal corresponding to the oscillating amplitude of the self-excited vibrator 10 is assumed or measured. The reference voltage Vref is preset such that the voltage Vref becomes higher than the transitional voltage and lower than the stable voltage.

Accordingly, because the monitor 27 can detect that the self-excitation of the vibrator 10 is started, the switch 26 can reliably change over the connection when the self-excitation of the vibrator 10 is started. That is, the converter 21 can reliably start generating the driving signal from the signal of the amplifier 22 when the self-excitation of the vibrator 10 is started.

In this embodiment, when the monitor 27 detects that the self-excitation of the vibrator 10 is started (first condition), the monitor 27 controls the switch 26. In contrast, in the first embodiment, when the predetermined period of time has passed from the start time of the operation of the sensor (second condition), the monitor 27 controls the switch 26. However, when one of the first and second conditions or both of the first and second conditions are satisfied, the monitor 27 may control the switch 26 to change over the connection.

Further, in this embodiment, the monitor 27 detects the output of the amplifier 22. However, the monitor 27 may detect an output of any constitutional element wherein the output is changed when the self-excitation of the vibrator 10 is started. For example, the monitor 27 may detect an output of the shifter 23, controller 24, amplifier 31 or 32, amplifier 33, detector 34, LPF 35, or adjusting circuit 36.

Moreover, this embodiment is not limited to the monitor 27 detecting the amplitude of the vibration driving signal. For example, the monitor 27 may detect and judge whether or not the frequency of the vibration driving signal is substantially the same as that assumed when the self-excitation of the vibrator 10 is started.

What is claimed is:

1. A gyro sensor, comprising:
a vibrator which is possible to be vibrated in self-excitation; outputs a first detecting signal indicating an oscillating amplitude and an oscillating frequency in the vibration of the vibrator when the vibrator is set in a condition of self-excitation, and outputs a second detecting signal indicating a yaw added to the vibrator;
a driving circuit which generates a first voltage, generates a control signal from the first detecting signal outputted from the vibrator, boosts the first voltage to a second voltage in response to the control signal to generate a driving signal set at both the second voltage and a driving frequency from the control signal, and transmits the driving signal to the vibrator to continue self-excitation of the vibrator in response to the driving signal; and
a yaw detecting circuit which generates a sensor signal corresponding to the yaw from the second detecting signal of the self-excited vibrator and outputs the sensor signal,
wherein the sensor further comprises a starting circuit which supplies a start signal of a start frequency to the driving circuit and causes the driving circuit to generate an oscillation encouraging signal in response to the start signal by boosting the first voltage to a voltage of the oscillation encouraging signal such that the self-excitation of the vibrator is started in response to the oscillation encouraging signal.

2. The sensor according to claim 1, wherein the starting circuit is adapted to cause the driving circuit to generate the oscillation encouraging signal in response to the start signal until the self-excitation of the vibrator is started and to cause the driving circuit to generate the driving signal from the first detecting signal when the vibrator has been self-excited.

3. The sensor according to claim 1, wherein the starting circuit is adapted to cause the driving circuit to generate the oscillation encouraging signal from the start signal until an elapsed time from the starting of the generation of the oscillation encouraging signal reaches a predetermined period of time and to cause the driving circuit to generate the driving signal from the first detecting signal when the elapsed time has reached the predetermined period of time.

4. The sensor according to claim 1, wherein the starting circuit comprises a monitor which is adapted to detect whether or not the vibrator is self-excited, and the starting circuit is adapted to cause the driving circuit to generate the driving signal from the first detecting signal when the monitor detects the self-excitation of the vibrator.

5. The sensor according to claim 1, wherein the driving circuit has a charge amplifier which changes a detected capacitance indicated by the first detecting signal of the vibrator to a detected voltage corresponding to the detected capacitance, and the starting circuit causes the driving circuit, when the self-excitation of the vibrator is started, to generate the control signal from the first detecting signal indicating the detected voltage and to generate the driving signal in response to the control signal.

6. The sensor according to claim 1, wherein the starting circuit comprises a starting clock generator which generates a starting clock signal of the start frequency and a selector which selects the starting clock signal of the starting clock generator, when an operation of the sensor is started, to cause the driving circuit to generate the oscillation encouraging signal in response to the starting clock signal and selects the first detecting signal of the vibrator, when the self-excitation of the vibrator is started, to cause the driving circuit to generate the driving signal from the first detecting signal.

7. The sensor according to claim 6, wherein the starting clock generator is a CR oscillator which generates clock pulses at the start frequency.

8. The sensor according to claim 1, wherein the starting circuit is a selector which selects the start signal generated outside the sensor, when an operation of the sensor is started, to cause the driving circuit to generate the oscillation encouraging signal in response to the starting clock signal.

9. The sensor according to claim 8, wherein the gyro sensor is used as an inertia sensor, and the start signal is a clock signal generated in an acceleration sensor or a microcomputer disposed outside the sensor.

10. The sensor according to claim 1, wherein the driving circuit has a phase shifter which generates a phase correcting signal for adjusting a phase of the driving signal, an amplitude controller which generates an amplitude control signal for maintaining an amplitude of the driving signal at a constant value, and a boost converter which boosts the first voltage in response to the start signal, when the starting circuit supplies the start signal to the boost converter, to generate the oscillation encouraging signal and boosts the first voltage in response to the first detecting signal, when the starting circuit supplies the first detecting signal to the boost converter, to generate the driving signal according to the phase correcting signal and the amplitude control signal.

11. The sensor according to claim 1, wherein the start frequency of the start signal is equal to or higher than the oscillating frequency of the vibrator.

12. The sensor according to claim 1, wherein a voltage of the start signal is lower than the first voltage.

* * * * *